Feb. 20, 1951 W. H. ROCKMAN 2,542,433
COASTER WAGON
Filed Aug. 9, 1948
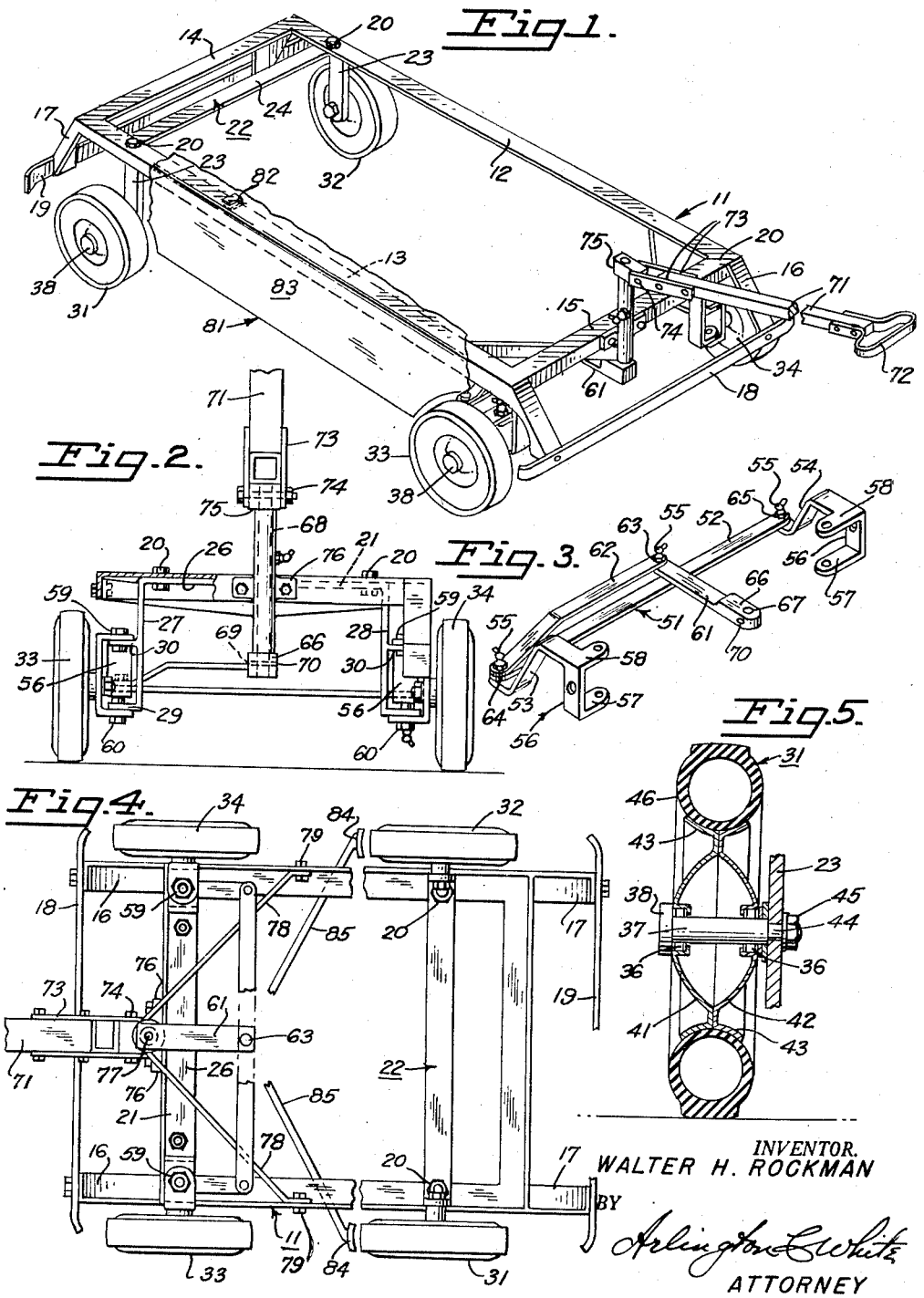
INVENTOR.
WALTER H. ROCKMAN
BY
Arlington G. White
ATTORNEY Patented Feb. 20, 1951

2,542,433

UNITED STATES PATENT OFFICE 2,542,433

COASTER WAGON

Walter H. Rockman, Richmond, Calif.

Application August 9, 1948, Serial No. 43,311

2 Claims. (Cl. 280—87.01)

The invention, in general, relates to amusement as well as utility devices for children, and more particularly relates to an improved coaster vehicle incorporating unique steering mechanism of facile manipulation as well as removable units for ready replacement to afford increased life of the vehicle.

Numerous coaster wagons of variable types have heretofore been marketed primarily for use by young boys and girls mainly for amusement or for the practice of some small enterprise, such as newspaper deliveries or the like. The majority of these prior coaster wagons are of but short life largely because of their frail construction and inability to withstand normal child abuse, such as handling appreciably heavy loads. Moreover, these prior vehicles inherently are disadvantageous due to the lack of provision therein of means enabling ready and facile dismantling of parts for repair or replacement. In addition, many of these prior wagons have faulty steering mechanisms rendering them dangerous for the average boy or girl to use and often causing injuries otherwise preventable by proper construction. The present invention is directed to the provision of an improved coaster wagon which is so fabricated as to withstand substantially all the abuse that can be applied thereto in normal play, which is so constructed as to obviate the many disadvantages of prior makes, and which is adaptable for use by adults in many environments because of its rugged fabrication and its ability to handle appreciably heavy loads.

A primary object of my invention is to provide a coaster wagon which affords ready and facile removal of worn or damaged parts and equally easy assembling of replacement parts.

Another important object of the present invention is to provide an improved coaster wagon of the indicated nature which is additionally characterized by the inclusion therein of positive acting, easily manipulated steering means.

A still further object of the present invention is to provide a coaster wagon of the aforementioned character which is of sturdy, rugged fabrication affording the hauling of appreciably heavy loads and lending durability and long life thereto.

Other objects of the invention, together with some of the advantageous features thereof, will appear from the following description of a preferred embodiment of the invention which is illustrated in the accompanying drawings. It is to be understood that I am not to be limited to the precise embodiment shown, nor to the precise arrangement of the various parts thereof, as my invention, as defined in the appended claims, can be embodied in a plurality and variety of forms.

Referring to the drawings:

Fig. 1 is a perspective view of a preferred embodiment of the invention.

Fig. 2 is a fragmentary, front elevational view of the preferred embodiment of the invention.

Fig. 3 is a perspective view of the steering control mechanism, omitting the steering post and handle, of the preferred embodiment of the invention.

Fig. 4 is a fragmentary, plan view of a preferred embodiment of the invention.

Fig. 5 is an enlarged elevational view, partly in section, of the wheel assembly and mounting employed in a preferred embodiment of the invention.

In its preferred form, the improved coaster wagon of my invention preferably comprises a frame, inverted U-shaped front and rear axle supporting members detachably connected to said frame, steering control means detachably connected to said front axle supporting member, together with ground-engaging wheels removably mounted on axles carried by said axle supporting members and a steering post detachably connected to said steering control means.

As particularly illustrated in Figs. 1 and 4 of the accompanying drawings, the present invention is embodied in a rugged, sturdy frame, designated generally by the reference numeral 11, consisting of a pair of sides 12 and 13 which are integral with front and rear elements 14 and 15, respectively, all fabricated from angle iron, as shown, to provide a rectangular-shaped frame. I also preferably so fabricate the frame 11 as to include thereon front and rear, inclined apron supporting elements 16 and 17, respectively, of angle iron stock; the front apron supporting elements serving as means for detachably mounting a front bumper 18 on the frame while the rear apron supporting elements serve to detachably mount a rear bumper 19 thereon.

Removably mounted on frame 11, by means of suitable screw-bolts 20 are generally U-shaped front and rear axle supporting members 21 and 22, respectively, both fabricated of flat bar stock and connected to the frame 11 in inverted-U positions, as shown. The rear axle supporting member 22 includes straight legs 23 which depend therefrom at opposite ends of a transverse bar 24 spanning the sides 12 and 13 of the frame, and thus such rear axle supporting member lends additional strength and support to the rear of the wagon for handling heavy loads. Front axle supporting member 21, while of generally inverted-U-shape, includes a flat bar 26, of shorter length than the flat bar 24 of the rear axle support 22, as well as a pair of depending legs 27 and 28 extending from opposite ends of the bar 26; each of the depending legs 27 and 28 being out-turned at the bottom thereof to provide laterally extending projections 29 thereon. In addition, a laterally extending projection 30 is secured to each of the depending legs 27 and 28 of front axle supporting member 21 in spaced relationship to the lateral projection 29 for purposes of mounting the unique steering control means of my improved coaster wagon, as hereinafter described.

As is customary, four ground-engaging wheels 31, 32, 33 and 34, arranged in transversely aligned pairs, are provided for supporting the frame 11. The rear wheels 31 and 32 are suitably journaled in the depending legs 23 of rear axle supporting member 22 by means of roller bearings 36 and short axles 37, see Fig. 5 of the drawings, each of which consists of a heavy bolt having an external, enlarged head 38 thereon which simulates a hub-cap. As shown in Fig. 5, the rear axles 37 pierce opposed, spaced rim sections 41 and 42, which together define a rim felly 43, as well as pierce at its reduced portion 44 the depending legs 23 of the rear axle support, and the rear axles are firmly but detachably connected in operative position by means of suitable nuts 45. A conventional hard rubber tire 46 is securely fastened, preferably by means of cement, to each rim felly 43.

As will be observed, the construction thus afforded by the assembly and detachable mounting of the indicated parts to frame 11, with the axle supporting members 21 and 22 and detachably mounted wheels 31 to 34 inclusive, enables ready and facile dismantling of the front and rear axle supporting members as well as the ground-engaging wheels simply by loosening and removing bolts 20 and 37. It is a somewhat remote possibilty that it ever would be necessary to remove the axle supports 21 and 22 for repair or replacement as the coaster wagon of my present invention has been successfully employed with a load in excess of 190 pounds, which is an abnormal weight in the case of usual child play with the wagon, without warping or otherwise damaging such members or any other portion of the wagon.

In accordance with my invention, the present embodiment is equipped with unique steering control means, designated generally by the reference numeral 51, comprising a cross-bar 52 on the opposite ends of which are pivotally mounted a pair of steering knuckles 53 and 54 each of which terminates in a fork 56 of spaced elements 57 and 58. Pivot pins or bolts 59 pierce each of the elements 58 of each fork 56 of the steering knuckles as well as the lateral projections 30 of the front axle supporting member 21 carried on the legs 27 and 28 thereof, and pivot pins or bolts 60 pierce each of the elements 57 of the forks 56 as well as the laterally extending projections 29 at the bottoms of the legs 27 and 28 of the front axle supporting member 21. To complete the mounting of the steering control means 51, I provide a pair of links 61 and 62 which are pivotally connected together by means of a pivot pin 63 with link 62, in turn, pivotally connected by means of either pivot pin 64 or pin 65 to one or the other of the steering knuckles 53 or 54. Suitable grease fittings 55 are provided in the pivotal connections of the steering knuckles as well as in the pivotal connections of the knuckles with the cross-bar 52 of the steering control means.

Link 61 of the steering control is provided with a boss 66 at its outer extremity; the boss having a socket 67 formed therein for receiving a steering post 68 which is firmly held in upright position by a pin or screw 69 piercing the boss and post through openings 70. A conventional handle 71, provided with a hand or finger grip 72 is pivotally connected to the steering post 68 through the medium of a bifurcated connector 73 and pin 74 piercing both elements of the connector 73 as well as piercing a head 75 on the upper end of the steering post 68. The entire steering control means, together with attached steering post, is detachably connected to the frame 11 by means of a clamp member 76, together with suitable screws piercing the clamp and front bar 15 of the frame, together with angularly disposed brace rods 78 integral with clamp 76, which are detachably connected by means of screw-bolts 79 to the underside of the sides 12 and 13 of frame 11. Thus, the steering post with attached handle as well as the entire steering control means can be readily taken down, as a unit, as well as assembled as a unit to and on the frame 11 whenever desired, simply by removing screw-bolts 77 from the clamp 76 and the screw-bolts 79 holding the braces 78 to the frame, or replacing such bolts after fitting the parts to the frame in their proper, operative positions; it being necessary also to remove and replace the pivot pins 59, 60 and either 64 or 65 depending to which side the steering control is connected.

In view of the foregoing described assembly and mounting means for the steering control mechanism, front ground-engaging wheels 33 and 34 conveniently are properly mounted for rotation by employing the front axle pins 57 which pierce the opposed rim sections 41 and 42 of the rims for the front wheels as well as which pierce the steering knuckles 53 and 54, as clearly shown in Fig. 2 of the annexed drawings. In all other respects, the front wheel mounting is similar to the mounting of the rear ground-engaging wheels 31 and 32.

Any desired type of super-structure, preferably rectangular in shape to conform to the shape of the frame 11, can be provided for affording a seat for the user and a body in which material can be carried. If a rectangular box-like structure is employed, such as is illustrated in fragmentary view in Fig. 1 of the accompanying drawings such box-like structure 81 can be detachably mounted on frame 11 utilizing suitable clips 82 which may be disposed so as to over-lie and under-lie the angle-irons of the frame as well as clamping the frame of the super-structure 81 thereto. The clips 82 may be fabricated of bifurcated, resilient material, such as bendable metal, to permit slipping the clips over flanges provided on the structure 81 as well as over the angle-iron sides, front and rear of the fame 11. Or, if desired, the structure 81 can be detachably connected to the frame 11 by using clips 82 together with suitable screwbolts. In order to enhance the attractiveness of the coaster wagon, the box-like structure 81 can be provided with a depending skirt or apron 83, cut away around or adjacent to the wheels 31 to 34 inclusive to simulate mud-guards over the wheels. The front and rear portions of the depending apron of structure 81 can be clipped or otherwise securely fastened to the apron supports 16 and 17 at the front and rear, respectively, of the frame 11 to lend rigidity to the super-structure.

In order that the improved coaster wagon of my present invention can be employed by children with utmost safety, I provide suitable brake shoes 84 for the rear ground-engaging wheels 31 and 32, together with suitable linkage 85 for actuating such brakes whenever desired. While shown only in fragmentary view in Fig. 1 of the drawings, the linkage 85 can be extended to the steering handle 71 for facilitating movement thereof by one or the other hand which normally holds the handle for steering the wagon.

In view of the simplicity of its construction, the coaster wagon of the present improvement can be manufactured at a relatively low coast and, since the various unitary operating elements thereof can be assembled and detachbly connected to the main frame of the wagon, the improvement is of appreciably long life as parts thereof can readily be substituted for worn or damaged parts. Moreover, because of the sturdiness of the frame and the ruggedness afforded by the manner of connecting the various elements and members together, inclusive of steering control means, the wagon is capable of withstanding appreciable abuse as well as excessively heavy loads.

It is to be understood that the appended claims are to be accorded a range of equivalents commensurate with the scope of the advance made over the prior art.

I claim:

1. In a coaster wagon, in combination a front axle supporting member, depending legs on opposite ends of said member, a first laterally extending projection on each of said legs, a second laterally extending projection on each of said legs in spaced relation to said first laterally extending projection, a cross-bar, steering knuckles pivotally mounted on opposite ends of said crossbar, a fork of spaced elements on each of said steering knuckles, pivot pins extending through the spaced elements of said fork as well as through said first and second laterally extending projections of said axle supporting member, and a pair of links pivotally connected together as well as to at least one of said steering knuckles.

2. In a coaster wagon as defined in claim 1, and including a boss having a socket therein secured to one link of said pair of links, and a steering post fixedly seated in the socket of said boss.

WALTER H. ROCKMAN.

REFERENCES CITED

The following references are of record in the file of this patent:

UNITED STATES PATENTS

| Number | Name | Date |
| --- | --- | --- |
| 779,606 | Keyes | Jan. 10, 1905 |
| 1,457,117 | London et al. | May 29, 1923 |
| 1,502,659 | Carlson | July 29, 1924 |
| 1,659,245 | Delker | Feb. 14, 1928 |
| 1,973,747 | Bukolt | Sept. 18, 1934 |
| 2,193,411 | Sheldon | Mar. 12, 1940 |
| 2,444,386 | Trabucco | June 29, 1948 |